United States Patent [19]

Sergot

[11] 4,086,069

[45] Apr. 25, 1978

[54] METHOD FOR SIMULTANEOUSLY CONCENTRATING AND PURIFYING PHOSPHORIC ACID

[75] Inventor: Joseph Sergot, Croissy-sur-Seine, France

[73] Assignee: Prorea S.A., Levallois-Perret, France

[21] Appl. No.: 656,466

[22] Filed: Feb. 9, 1976

[30] Foreign Application Priority Data

Feb. 25, 1975 France .................. 75 05791

[51] Int. Cl.² ............................ B01D 19/00
[52] U.S. Cl. .......................... 55/48; 55/53; 55/71; 159/4 A; 159/DIG. 19
[58] Field of Search ................ 55/73, 71, 48, 53; 203/49; 159/DIG. 19, 16 A, 16 R, 4 A, 4 CC; 423/321 R; 23/307

[56] References Cited

U.S. PATENT DOCUMENTS

| 3,276,510 | 10/1966 | Austin et al. | 159/DIG. 19 |
|---|---|---|---|
| 3,397,123 | 8/1968 | Cull | 423/321 X |
| 3,544,269 | 12/1970 | Rushton | 423/321 X |
| 3,718,729 | 2/1973 | Amin et al. | 423/321 |
| 3,764,658 | 10/1973 | Darwin et al. | 423/321 |

FOREIGN PATENT DOCUMENTS 600,810  6/1960  Canada .................. 159/DIG. 19

*Primary Examiner*—Bernard Nozick
*Attorney, Agent, or Firm*—Sughrue, Rothwell, Mion, Zinn and Macpeak

[57] ABSTRACT

The invention has as its object a method for simultaneously concentrating and purifying phosphoric acid. It consists in bringing into contact, in a tower, the acid to be concentrated and purified divided into fine droplets with a current of hot gases and in collecting, at the bottom of the tower, the concentrated and purified acid. Previously, the acid has been mixed, with water and with a fraction of the said concentrated and purified acid. The invention is implemented for the producing of phosphoric acid having a very low fluorine content, suitable for being used for the synthesis of phosphate foodstuffs.

5 Claims, 2 Drawing Figures

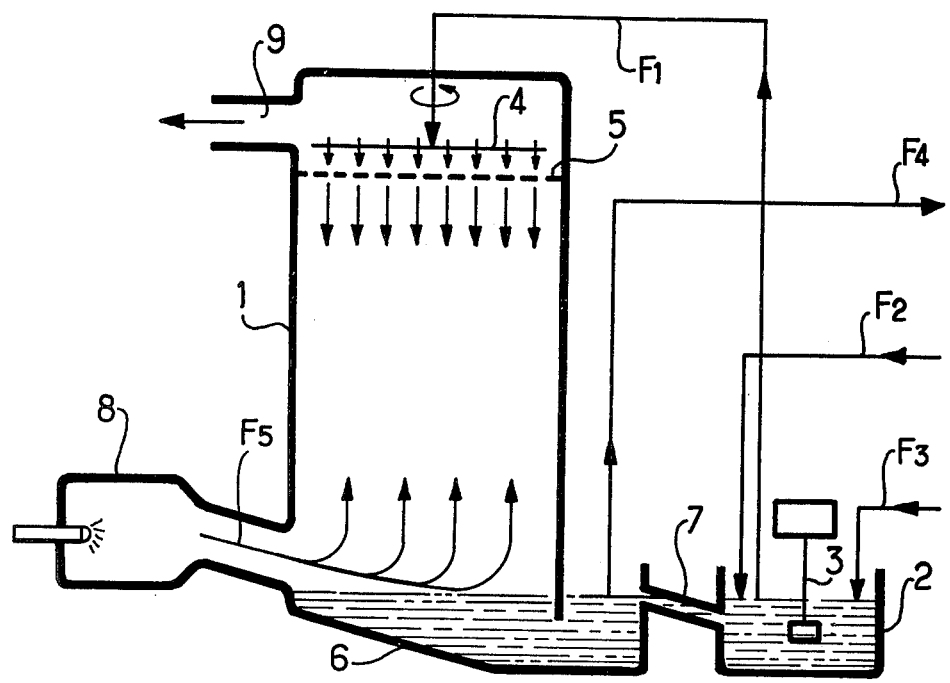
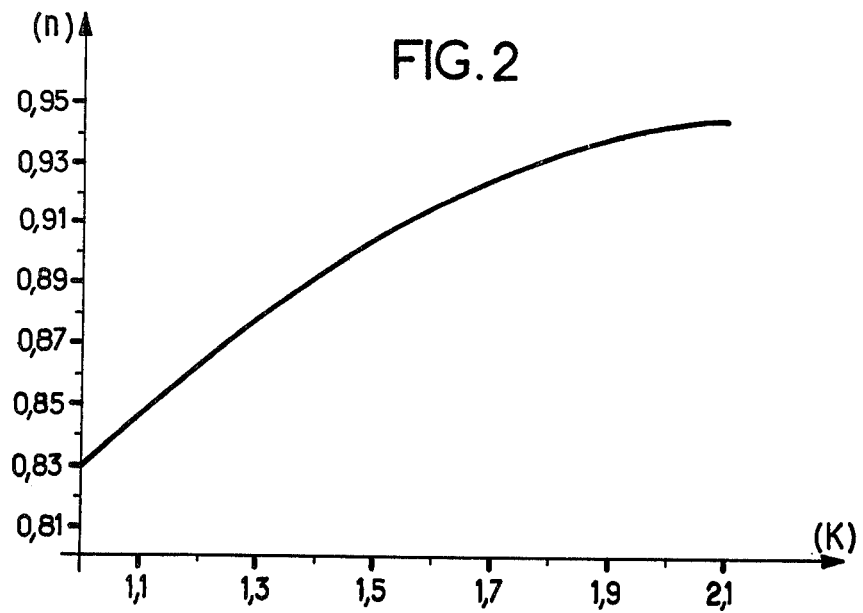

METHOD FOR SIMULTANEOUSLY CONCENTRATING AND PURIFYING PHOSPHORIC ACID

The present invention has as its object a method enabling the concentrating as well as the purifying of phosphoric acid solutions to be effected simultaneously.

It is known that phosphoric acid produced, using methods called "wet methods" contains a quantity of fluorine on the order of 2%, this making it unsuitable for use in the manufacturing of calcium or magnesium phosphates intended particularly as a foodstuff for livestock.

Such an element comes from the impurities of the phosphate ore used as a raw material in the manufacturing of phosphoric acid and it is found in the said acid in the form of derivatives of hexafluosilicic acid $SiF_6H_2$, which decompose, moreover, within the phosphoric acid, into silicium tetrafluoride $SiF_4$ and into hydrofluoric acid HF, by the reaction:

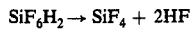

$$SiF_6H_2 \rightarrow SiF_4 + 2HF$$

Moreover, silicium tetrafluoride also hydrolyses, giving a precipitate of silica, by the reaction:

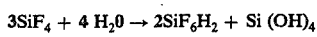

$$3SiF_4 + 4H_2O \rightarrow 2SiF_6H_2 + Si(OH)_4$$

Moreover, the mineral phosphate also contains metallic impurities, more particularly aluminium, which reacts with HF and $SiF_4$, forming soluble fluorinated compounds of the type $AlF_2^+$ and $AlF^{2+}$.

Consequently, with a view to removing the fluorine combined with the aluminium and other metals such as alkaline metals also coming from the ore, it is advisable for the quantity of silica in the phosphoric acid to be slightly in excess, according to the law of mass action, so that the following reversible reaction is effected preferably in the direction 1:

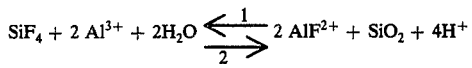

$$SiF_4 + 2Al^{3+} + 2H_2O \underset{2}{\overset{1}{\rightleftharpoons}} 2AlF^{2+} + SiO_2 + 4H^+$$

Taking as a basis the preceding considerations, a certain number of processes aiming at promoting the removal, in the form of gas or vapours of $SiF_4$ and of HF, of the fluoride in phosphoric acid solutions have been proposed.

Such processes, based on the difference between the vapor pressure of $SiF_4$ and of HF on the one hand and of solutions of phosphoric acid on the other hand, consist generally in submitting the said solutions either to the action of heat or to the action of a vacuum, or to the simultaneous action of heat and vacuum, so that $SiF_4$ and HF are removed in the form of vapours mixed with a certain quantity of water from the phosphoric acid solution.

More particularly, it is possible either to evaporate the phosphoric acid solution in a vacuum. a temperature on the order of several hundreds of degrees, or to make bubble hot air or steam through the said solution.

Nevertheless, the implementing of such methods does not make it possible to obtain phosphoric acid having a sufficiently low fluorine content to allow the subsequent use thereof in the synthesis of foodstuffs.

It is therefore necessary, for that purpose, to use phosphoric acid obtained from phosphorous or resulting from selective extraction by a solvent from impure phosphoric acid, the extraction being followed by distillation to recover pure acid, in other words, to use expensive and relatively complex methods.

Moreover, known methods do not make it possible to effect, simultaneously, sufficient concentration and purifying of such acids and, moreover, they consume a remarkable quantity of energy, thus involving high operational costs.

The present invention makes it possible to overcome the disadvantages of known methods which have been outlined hereinabove and it has as its object a method making it possible to simultaneously concentrate and effectively purify an aqueous solution of phosphoric acid, it being possible to use the resulting acid for synthesizing of phosphate foodstuffs, such a method being very simple to implement and having a moderate cost.

The invention therefore has as its object a method for simultaneously concentrating and purifying an aqueous solution of phosphoric acid of fluorinated derivatives, consisting in effecting continuously the following concommittant operations;

The aqueous phosphoric acid solution to be concentrated and purified is conveyed to an enclosure or tower;

The aqueous phosphoric acid solution is brought into contact with a current of hot gases;

The concentrated phosphoric acid which is purified of fluorinated derivatives is collected at the bottom of the tower;

The water and the fluorinated derivatives resulting from the concentrating and purifying of the aqueous solution of phosphoric acid are removed substantially at the top of the said tower;

The method being characterized in that prior to the conveying of the aqueous solution of phosphoric acid towards the tower, the solution is mixed, with water and with a fraction of the concentrated and purified phosphoric acid collected at the base of the tower.

Other characteristics and advantages of the invention will become apparent from the following description, given by way of a purely illustrative example having no limiting character, with reference to the accompanying drawing and diagram, in which:

FIG. 1 schematically illustrates a device enabling the method according to the invention to be illustrated clearly.

FIG. 2 is a plot of effectiveness of defluorination n as a function of the factor K which also enables the method according to the invention to be illustrated.

FIG. 1 shows an enclosure or tower 1 receiving, at its top, in the direction of the arrow F1, a phosphoric acid solution coming from a first tank 2, tank 2 being fed with a raw phosphoric acid solution (which is intended to be concentrated and purified) in the direction of the arrow F2 and with water in the direction of the arrow F3. Reference 3 designates a motor-stirrer assembly suitable for rendering the solution contained in tank 2 homogeneous.

The solution conveyed to the top of the tower 1 in the direction of the arrow F1 is divided into fine droplets and distributed in the tower 1 by means of a rotating device 4 co-operating with a distributing grid 5, which are known per se.

Reference 6 designates a second tank arranged at the base of the tower 1 to receive the concentrated and purified phosphoric acid solution. A fraction of that solution is conveyed towards the outside in the direction of the arrow F4 whereas another fraction can flow into the the first tank 1 by means of pipe 7.

A burner referenced by numeral 8 is provided for blowing a current of hot gases indicated by the arrows F5 in such a way that the gases rise and are diffused homogeneously and regularly over the whole cross-section of the tower 1. That burner is fed, for example, with fuel oil.

The top of the tower 1 further comprises a pipe 9 for removing the water and the impurities taken from the phosphoric acid.

The method according to the invention can be clearly illustrated as follows:

The first tank 2 is fed continuously in the direction F2 with raw phosphoric acid containing about 28.7% phosphoric anhydride $P_2O_5$ and 1.72% fluorine and in the direction F3 with water, the proportion by weight between the flow of raw acid and the flow of water being at least equal to 1.5, for example 2.4. That mixture is then directed towards the top of the tower 1 in the direction F1 and divided into fine droplets by the device 4 and the grid 5 as previously set forth. Those droplets come into contact, in the tower 1, with the hot gases coming from the burner 8 (as well as, moreover, a certain quantity of water vapour resulting from the action of the said gases on the solution contained in the tank 6). The result of this is, simultaneously, a concentration of the acid and a purifying, whereby fluorine compounds such as HF and $SiF_4$ are removed in gaseous form by the said hot gases. The water and the impurities are then removed by pipe 9 towards a washing tower, in which the condensed fluorinated compounds can be recovered with a view to the synthesizing of commercial products.

The concentrated and purified acid is therefore collected in the tank 6.

That acid contains 52.1% of $P_2O_5$ and contains less than 0.2% of fluorine.

A certain part of that acid is conveyed towards the outside in the direction of the arrow F4, whereas the remaining fraction is conveyed through 7 into the tank 2 to be mixed therein with raw acid and with water, the mixture conveyed then being towards the top of the tower 1 in the direction F1. A certain quantity of purified and concentrated acid is thus returned into the concentrating and purifying device.

It will be observed that the proportion by weight between the discharge of acid returned to the tank 2 and the discharge of acid conveyed towards the outside in the direction F4 is between 7 and 17, for example 12.1.

A description will be given hereinbelow, by way of an example, of the operating conditions of a unit for simultaneously concentrating and purifying phosphoric acid implementing the method according to the invention.

Discharge of raw phosphoric acid (containing 28.7% of $P_2O_5$ and 1.72% of F) in the direction of F2: 1 metric ton per hour.

Discharge of water in the direction of F3: 0.4 cu.m.per hour.

Discharge of phosphoric acid conveyed in the direction of F1: 8.07 metric tons per hour.

Dischrge of concentrated and purified phosphoric acid (containing 52.1% of $P_2O_5$ and 0.2% of F) produced in the direction F4: 0.55 metric tons per hour.

Discharge of concentrated and purified phosphoric acid returned through 7: 6.67 metric tons per hour.

Temperatures of the gases F5: about 700° C

Temperature of the gases in the pipe 9: 90° to 120° C

Temperature of the acid produced F4: 85° to 110° C

By way of comparison and similar operating conditions, the acid produced contains 0.55% of F instead of 0.27% of F if no water is added in the tank in the direction F3.

That particularity is, moreover, illustrated by the diagram in FIG. 2 established experimentally by the applicant, which represents the efficiency of defluorization n as a function of the factor K defined as follows:

$$K = 1 + W/A1 \times C2/C2-C1$$

W being the quantity of water added in the direction F3;
A1 being the quantity of raw acid in the direction F2;
C1 being the original concentration of the acid;
C2 being the final concentration of the acid;
The efficiency n itself being defined by the equation:

$$n = 1 - f2/f1 \times C1/C2$$

$f1$ and $f2$ being the fluorine content of the raw and concentrated acid respectively.

The diagram in FIG. 2 therefore shows clearly that the purifying efficiency increases when water is added to the raw acid, in such a way that values of 0.95 can easily be reached.

The method according to the invention therefore makes it possible to simultaneously effect the concentrating and the purifying of a phosphoric acid in such a way that a product suitable for use in the synthesis of phosphate foodstuffs be obtained.

Moreover, it should be observed that the implementing of such a method requires only simple conventional apparatus which is not very expensive.

Moreover, as the operational process takes place between droplets and gases, it should be observed that the "internal resistance" of the process is slight, resulting in a great saving of energy which results in a moderate operational cost.

It must be understood that the invention is in no way limited to the embodiment described and illustrated, which has been given only by way of an example.

More particularly, it is possible, without going beyond the scope of the invention, to modify details, change certain arrangements and compositions or replace certain means by equivalent means.

By way of an example, it is possible to add silica, if need be, to increase the $SiO_2/F$ ratio in the treated acid and consequently to make the forming and the giving off of the gaseous fluorinated derivatives easier.

I claim:

1. A method for simultaneously concentrating and purifying an aqueous phosphoric acid solution of fluorinated derivatives, consisting of effecting continuously the following operations:
    (1) the aqueous phosphoric acid solution to be simultaneously concentrated and purified is introduced into an enclosure or tower;
    (2) the aqueous phosphoric acid solution to be simultaneously concentrated and purified is brought into contact with a current of hot combustion gases in the enclosure or tower;

(3) phosphoric acid simultaneously concentrated and purified of the fluorinated derivatives is collected at the bottom of the enclosure or tower;

(4) water and the fluorinated resulting from the simultaneous concentration and purification of the aqueous phosphoric acid solution are removed substantially at the top of the enclosure or tower as are the combustion gases;

(5) wherein prior to introducing the aqueous phosphoric acid solution to be simultaneously concentrated and purified into the enclosure or tower, the aqueous phosphoric acid solution to be simultaneously concentrated and purified is formed by raw aqueous phosphoric acid solution being mixed with water and with a fraction of the concentrated and purified phosphoric acid collected at the base of the enclosure or tower, the balance of the simultaneously concentrated and purified collected phosphoric acid being removed from the enclosure or tower as product, wherein the ratio by weight of the amount of the raw aqueous phosphoric acid solution to be simultaneously concentrated and purified and the amount of the water mixed therewith is greater than 1.5 to 1, and wherein there is added from 7 to 17 parts by weight of the concentrated and collected purified phosphoric acid to the aqueous phosphoric acid solution being passed to the enclosure or tower to be simultaneously concentrated and purified per 1 part by weight of concentrated and collected purified phosphoric acid removed from the enclosure or tower as product.

2. The method of claim 1, wherein the ratio of the amount of the raw aqueous phosphoric acid solution to be simultaneously concentrated and purified and the amount of water mixed therewith is equal to 2.4 to 1.

3. The method of claim 1, wherein there is added substantially 12.1 parts by weight of the concentrated and collected purified phosphoric acid to the aqueous phosphoric acid solution being passed to the enclosure or tower to be simultaneously concentrated and purified per 1 part by weight of the concentrated and collected purified phosphoric acid removed from the enclosure or tower as product.

4. The method of claim 1, wherein the hot combustion gases are contacted with the aqueous phosphoric acid solution to be simultaneously concentrated and purified in countercurrent flow therewith.

5. The method of claim 4, wherein the hot combustion gases result from the combustion of fuel oil.

* * * * *